Patented Mar. 17, 1942

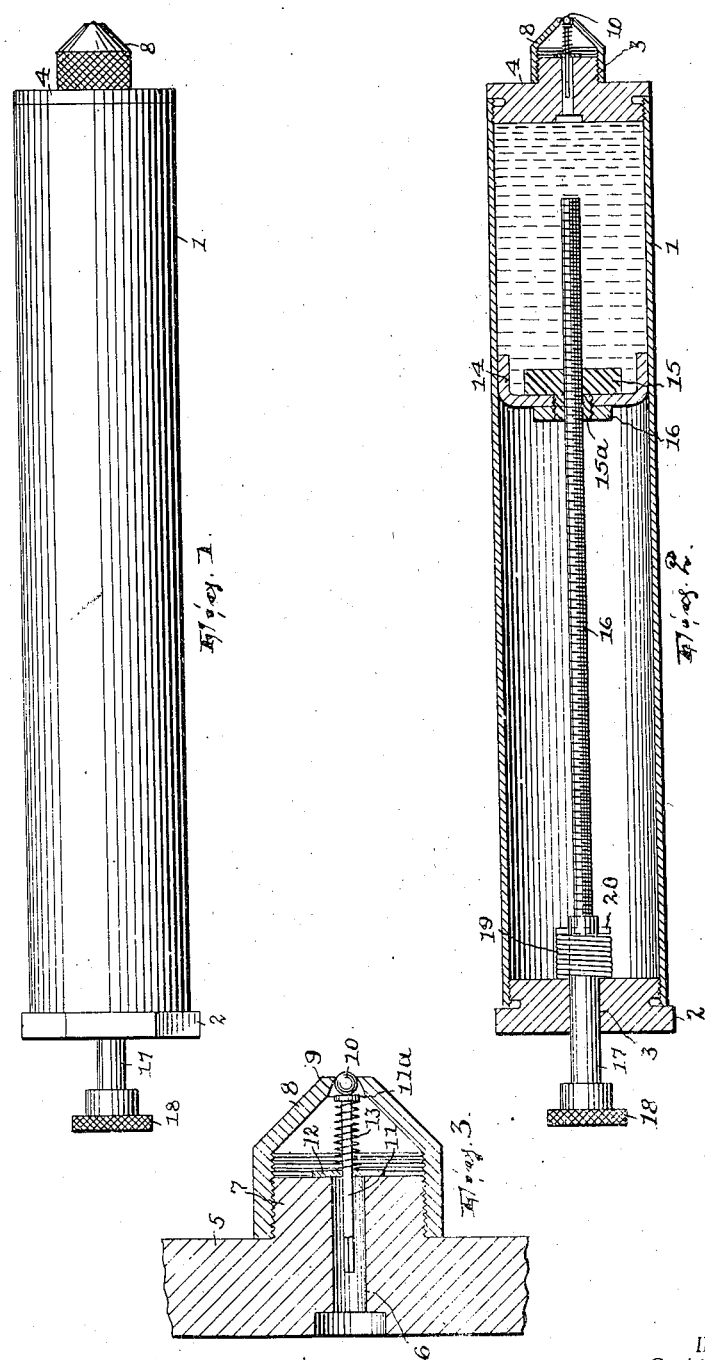

2,276,722

UNITED STATES PATENT OFFICE 2,276,722

MARKING IMPLEMENT

Bernard S. Hillman, Paterson, and Armond Nazzaro, Warren Point, N. J.

Application February 15, 1941, Serial No. 379,072

1 Claim. (Cl. 91—62.5)

This invention relates to implements for delivering liquid of a viscous nature, as when the implement is used for marking purposes.

According to the invention there are the following parts: A cylinder having at one end, which is preferably tapered, a valved outlet, a piston fitting the cylinder and movable from substantially its other or butt end to substantially its outlet end and adapted to exert expelling pressure on the liquid existing between the piston and valved end and spring-urged means to force the piston towards the latter end. If the cylinder is to have ample length and hence capacity said means cannot be merely a spring because of the too great disparity between the force it exerts when contracted and that it exerts when expanded. Hence, according to the invention said means takes the following form: There is a screw or threaded spindle arranged to be in threaded engagement with the piston during the whole movement of the latter from substantially end to end of the cylinder and which is freely rotatable and also thrustwise-movable in the butt end of the cylinder and a spring provides a force for impelling the spindle and hence the piston towards the outlet end of the cylinder; but the thrustwise movement of the spindle, at least towards the outlet end of the cylinder, is so limited as to be less, preferably appreciably so, than the full stroke of the piston, whereby a spring may be used which will not exist with undue disparity in the force it exerts when tensioned and when less tensioned.

In the drawing:

Fig. 1 is a side view of the implement;

Fig. 2 is a view thereof mainly in longitudinal section; and

Fig. 3 is an enlarged longitudinal sectional view of the valve-including head 4 of the cylinder.

1 is a cylinder proper and 2 and 4 are heads scewed therein at its butt and point ends, respectively, and forming therewith the cylinder.

The head 2 is formed with a smooth axial bore 3. The head 4 includes a body 5 which has an axial smooth bore 6 extending through a threaded projection 7 at the outer side of the body.. Onto projection 7 is screwed a tapered cap 8 in whose apex is an outlet 9 which provides an internal valve-seat. A ball-valve 10 seats on the valve-seat, protruding somewhat from the outlet, and it is held against the valve-seat by plunger 11 between whose head 11a and a washer 12 abutting projection 7 is a helical spring 13. When the valve is pressed inward, as by the surface to be marked, the liquid content of the cylinder may escape.

In the cylinder is the mentioned piston here comprising a cup-shaped flexible gasket 14 fitted over the exteriorly threaded axial projection 15a of a nut 15 and clamped to such nut by a clamping nut 16 screwed on the projection.

The mentioned spindle has the major or contained portion of its length threaded at 16 and the remaining portion or shank 17 thereof smooth or unthreaded. This latter portion penetrates and preferably fits snugly the bore 3 of head 2 and it is equipped with the external knob 18. The threaded portion 16 is in threaded engagement with the nut 15, which it penetrates axially, and it is of such length as to be adapted to advance the plunger at least close to the head 4 on rotating the spindle in the appropriate direction. Such direction is preferably clockwise, viewing the cylinder from a point opposite its butt, the spindle threading being left-handed.

19 indicates the mentioned spring, which is here helical and penetrated by the shank 17 of the spindle, being interposed between head 2 and a pin 20 penetrating the shank.

The implement is made to receive the viscous liquid or substance by removing the head 4 having retracted the piston by rotating the spindle counter-clockwise.

Said head being replaced, the spindle is rotated clockwise which, as soon as the resulting motion of the piston toward the outlet end of the cylinder is checked by the liquid, will if continued result in thrustwise displacement of the spindle toward the butt end of the cylinder, thus compressing the spring; this may be continued until the spring is fully compressed or the part 20 of the spindle forming an abutment thereon has attained its retractive limit shown. The spring and spindle now constitute means to exert yielding pressure on the liquid wherefore, when the valve 10 is opened, as by pressing it against the surface to be marked with the liquid, such liquid is expelled. The feeding of the liquid from the outlet may continue in this way until the part of the spindle formed by abutment 18 engages the butt of the cylinder, at which time the spring should preferably be at a degree of tension approximating that of its fully compressed state. Thereupon the spindle must again be turned clockwise and so displaced toward the butt end of the cylinder in order to re-set the spring or restore the implement to operative state.

Depending on the ratio of thrustwise movability of the spindle (determined here by abutments 18 and 20) to the interior length of the cylinder (i. e., the thrustwise movability of the piston), the over-all length of the implement, even when the spindle is fully retracted as in Figs. 1 and 2, may not be appreciably greater than the length of the cylinder. In short, the spindle need never protrude from the butt of the cylinder so as to be a source of inconvenience in handling the implement, especially in the marking operation.

Having thus fully described our invention, what we claim is:

An implement for the purpose set forth including a cylinder having an outlet in one end formed with an internally facing valve-seat, a valve seated against the valve-seat and protruding at the outlet, a piston in the cylinder, and elastic means normally urging the piston toward said end of the cylinder and including a spindle independent of the valve and penetrating and having a threaded engagement with the piston and also penetrating and rotatable and slidable back and forth in the other end of the cylinder and a spring engaging the spindle and cylinder and urging the former toward the valved end of the latter, said spindle having its back and forth thrustwise movement directly limited by the cylinder to an extent less than the extent to which the piston is movable lengthwise of and in the cylinder.

BERNARD S. HILLMAN.
ARMOND NAZZARO.